United States Patent [19]

Washizu et al.

[11] Patent Number: 5,072,902
[45] Date of Patent: Dec. 17, 1991

[54] STRUCTURE FOR SECURING PIPES TOGETHER

[75] Inventors: Katsushi Washizu, Numazu; Yuji Miyauchi, Shizuoka, both of Japan

[73] Assignee: Usui Kikusai Sangyo Kaisha Ltd., Japan

[21] Appl. No.: 618,727

[22] Filed: Nov. 27, 1990

[30] Foreign Application Priority Data

Nov. 29, 1989 [JP] Japan ............................. 1-138190[U]

[51] Int. Cl.5 .............................................. F16L 3/08
[52] U.S. Cl. ....................................... 248/65; 138/106
[58] Field of Search ................. 246/68.1, 49, 65, 74.1; 138/106

[56] References Cited

U.S. PATENT DOCUMENTS

| 3,045,707 | 7/1962 | Loper | 138/106 |
| 4,795,114 | 1/1989 | Usui | 248/62 |
| 4,826,114 | 5/1989 | Umehara | 248/74.1 |
| 4,927,103 | 5/1990 | Nicholson | 248/62 |

Primary Examiner—Ramon O. Ramirez
Assistant Examiner—Robert A. Olson
Attorney, Agent, or Firm—Anthony J. Casella; Gerald E. Hespos

[57] ABSTRACT

A securing structure is used in securing a plurality of pipes of comparatively small diameter together. With each pipe having a flat surface portion in a straight section thereo, a bracket body is injection-molded from thermoplastic resin such that the flat surface portion and its vicinity of each pipe are embedded in the bracket body.

8 Claims, 1 Drawing Sheet

PRIOR ART

STRUCTURE FOR SECURING PIPES TOGETHER

BACKGROUND OF THE INVENTION

1. Field of the Invention

This invention relates to an improvement of a structure for securing a plurality of pipes together.

2. Description of the Prior Art

Metal or resin pipes of comparatively small diameter (no greater than about 15 mmm) are widely used as fuel pipes, vacuum pipes, hydraulic pipes, etc. in various machines such as cars.

To secure such pipes together, conventionally, a bracket member 11 made of resin as shown in FIG. 4 is used which is formed with a plurality of grip grooves 12. Specifically, the respective straight sections of a plurality of pipes arranged side by side are pressure-fitted in the corresponding grip grooves 12.

In the foregoing structure wherein the respective straight sections of pipes arranged side by side are pressure-fitted in the grip grooves 12 of the bracket member 11 molded beforehand, the work of fitting the individual pipes in the grip grooves 12 is troublesome, lowering work efficiency. Further, due to improper fitting, aging and fatigue of a grip portion of the groove 12, vibration, etc., each pipe tends to shift axially or circumferentially or come out of the grip groove. That is, the gripped condition of each pipe is uncertain.

SUMMARY OF THE INVENTION

It is an object of the present invention to provide a structure for securing pipes together which can reliably secure pipes together without the need of troublesome fitting work and without any fear of displacement and detachment.

To accomplish the foregoing object, the present invention provides a structure for securing pipes together each having a flat surface portion in a straight section thereof, which is characterized in that a bracket body is injection-molded from thermoplastic resin such that the flat surface portion and its vicinity of each pipe are embedded in the bracket body. Each pipe may have a pair of flat surface portions as formed by slightly depressing it.

Since the flat surface portions of the pipes are embedded together in the bracket body, there is no need of troublesome fitting work, increasing work efficiency, there is no fear of axial/circumferential displacement and detachment of the pipes even under vibration, and there is provided a reliable structure in which the pipes are tightly secured together.

DETAILED DESCRIPTION OF THE PREFERRED EMBODIMENTS

Figure 1:
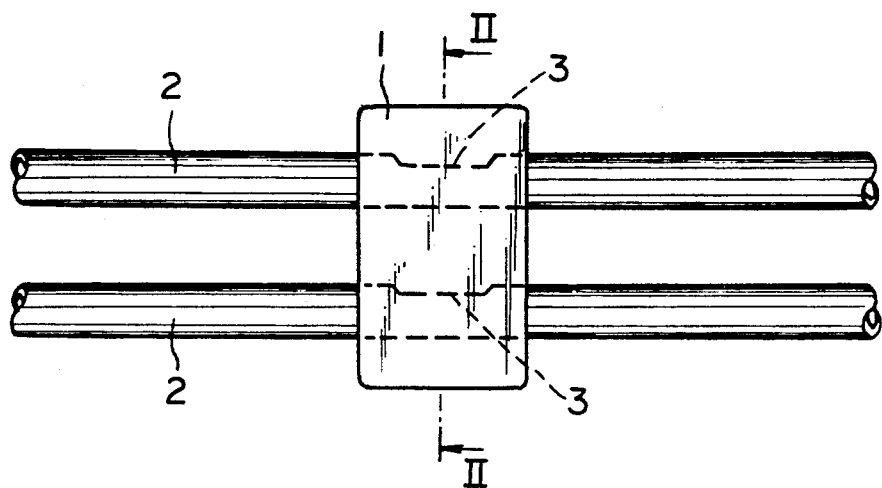
FIG. 1 is a plan view showing a structure for securing pipes together according to an embodiment of the present invention.
Figure 2:
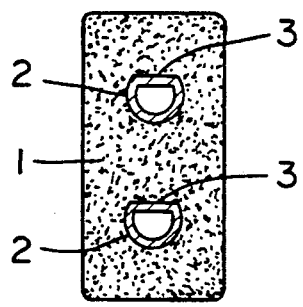
FIG. 2 is a sectional view taken along line II—II in FIG. 1.
Figure 3:
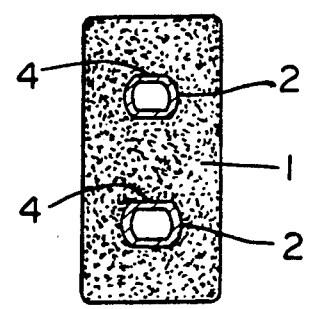
FIG. 3 is a sectional view showing another embodiment of the present invention.
Figure 4:
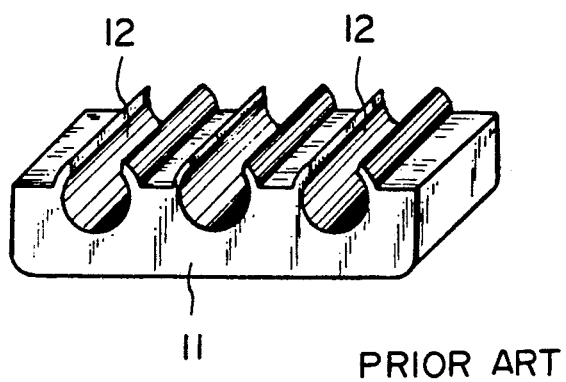
FIG. 4 is a perspective view showing a conventional bracket member.

In FIGS. 1 through 3, a bracket body 1 is injection-molded from thermoplastic resin, such as nylon, polyethylene, polypropylene, polyacetal and ABS. A pipe 2 is made of metal or resin, whose diameter is on the order of 15 mm or less. A peripheral portion of the straight pipe 2 is made flat as to define a flat surface portion 3. A plurality of such flat surface portions 3 are arranged side by side and subjected to injection molding such that these flat surface portions 3 and their vicinities are embedded together in the bracket body 1 thus molded. A modification of the flat surface portion 3 is designated by "4" in FIG. 3, which is a pair of flat surface portions formed by depressing the pipe slightly.

As described above, according to the present invention, a plurality of pipes 2 are secured together when the bracket body 1 is molded, so that the flat surface portion 3 and its vicinity of each pipe are embedded in the bracket body 1. Therefore, the pipes can be readily and reliably secured together without the need of troublesome fitting work, there is no fear of axial/circumferential displacement and detachment of the pipes even under vibration, and there is provided a reliable structure in which the pipes are tightly secured together by the bracket body.

What is claimed is:

1. A pipe securing structure comprising: a plurality of elongated pipes, each said pipe having a longitudinally extending securing section with opposed longitudinal ends and a selected cross-sectional configuration, each said pipe further including portions extending longitudinally from the respective opposed ends of the securing section and defining cross-sectional configurations different from the securing section; and a bracket body unitarily injection molded from a thermoplastic resin such that the thermoplastic resin of the bracket body surrounds and engages the entire securing section of each said pipe and regions of each said pipe adjacent the opposed ends of the respective securing sections, whereby the surrounding engagement of the thermoplastic resin with the securing sections and regions of each said pipe adjacent the respective securing sections prevents relative movement between the pipe and the bracket body.

2. A securing structure according to claim 1, wherein the bracket body is molded from a thermoplastic resin selected from the group consisting of nylon, polyethylene, polypropylene, polyacetal, and ABS.

3. A securing structure according to claim 1 wherein each said pipe is made of metal.

4. A securing structure as in claim 1, wherein each said pipe is made of resin.

5. A securing structure as in claim 1, wherein the portions of each said pipe adjacent the securing section are of substantially circular cross-sectional configuration.

6. A securing structure as in claim 1, wherein the securing section of each said pipe is characterized by at least one flat surface portion.

7. A securing structure according to 6 wherein each said pipe has a pair of flat surface portions.

8. A pipe securing structure comprising: a plurality of elongated pipes, each said pipe being unitarily formed and having a longitudinally extending securing section intermediate the length of each respective pipe, the securing section including at least one flat surface portion, each said pipe being of substantially circular cross-section adjacent each longitudinal end of the securing section; and a bracket body unitarily injected molded from a thermoplastic resin, such that the thermoplastic resin of the bracket body surrounds and engages the entire securing section of each said pipe and regions of each said pipe adjacent to the respective securing sections, whereby the surrounding engagement of the thermoplastic resin with the securing sections and regions of each said pipe adjacent to the securing sections prevents relative longitudinal and rotational movement of each said pipe relative to the bracket body.

* * * * *